(12) United States Patent
Bertrand et al.

(10) Patent No.: US 12,493,388 B1
(45) Date of Patent: Dec. 9, 2025

(54) ANTI-WARPING SEGMENTS OF A CAPACITANCE MODULE

(71) Applicant: Cirque Corporation, Sandy, UT (US)

(72) Inventors: Jon Bertrand, Taylorsville, UT (US); Paul Glad, Sandy, UT (US); Douglas Steck, Riverton, UT (US)

(73) Assignee: Cirque Corporation, Sandy, UT (US)

( * ) Notice: Subject to any disclaimer, the term of this patent is extended or adjusted under 35 U.S.C. 154(b) by 21 days.

(21) Appl. No.: 18/739,745

(22) Filed: Jun. 11, 2024

(51) Int. Cl.
*G06F 3/044* (2006.01)
*H01Q 1/22* (2006.01)

(52) U.S. Cl.
CPC ......... *G06F 3/0445* (2019.05); *H01Q 1/2266* (2013.01); *G06F 3/0446* (2019.05); *G06F 2203/04103* (2013.01); *G06F 2203/04107* (2013.01)

(58) Field of Classification Search
CPC .......... G06F 3/0445; G06F 3/0446; G06F 2203/04103; G06F 2203/04107; H01Q 1/2266
See application file for complete search history.

(56) References Cited

U.S. PATENT DOCUMENTS

| | | | |
|---|---|---|---|
| 8,861,181 B2 | 10/2014 | Lee | |
| 2013/0162594 A1* | 6/2013 | Paulsen | H01Q 1/22 345/173 |
| 2015/0101849 A1 | 4/2015 | Bockmeyer | |
| 2018/0316098 A1* | 11/2018 | Amadjikpe | H01Q 19/005 |
| 2019/0166686 A1* | 5/2019 | Jo | H05K 1/0298 |
| 2022/0350430 A1* | 11/2022 | Bertrand | H01Q 1/421 |

* cited by examiner

*Primary Examiner* — Patrick N Edouard
*Assistant Examiner* — Joseph P Fox

(57) ABSTRACT

A capacitance module may include a sensor layer having a set of electrodes; a component layer having a controller in communication with the set of electrodes; a shield layer positioned between the sensor layer and the component layer; an antenna disposed on the component layer; and anti-warping segments adjacent to the antenna and disposed on the component layer. The anti-warping segments may be electrically isolated from each other.

18 Claims, 12 Drawing Sheets

ANTI-WARPING SEGMENTS OF A CAPACITANCE MODULE

FIELD OF THE DISCLOSURE

This disclosure relates generally to systems and methods for capacitive touch/proximity sensors. In particular, this disclosure relates to systems and methods for reducing warping and/or delamination in capacitive touch/proximity sensors.

BACKGROUND

A capacitive sensor is often made of several layers which are bonded together. In some manufacturing processes, heat may be applied to the layers. During the processes that involve heating, some layers of the capacitive sensor may expand at different rates, causing the capacitive sensor to warp.

An example of preventing warping in an electronic component is disclosed in U.S. Pat. No. 8,861,181 issued to Chang Ho Lee, et al. This reference discloses a multilayer ceramic component, including: a ceramic main body having internal electrodes laminated therein; and external electrodes formed on both ends of the ceramic main body in a length direction thereof, wherein each of the external electrodes includes a first layer formed on the ceramic main body and including a conductive metal, and a second layer formed on the first layer and including a conductive resin, and when Tc is a thickness of a cover layer of the ceramic main body, L1 is a length from either end of the ceramic main body in the length direction thereof to an end of the first layer formed on an upper surface or a lower surface of the ceramic main body, thus providing excellent reliability.

Another example of is disclosed in US Patent Publication No. 2015/0101849 issued to Matthias Bockmeyer, et al. This reference discloses a transparent electrical conductor with a transparent substrate and an electrically conductive layer on the substrate are provided. The conductive layer has a plurality of electrically conductive nanoscale additives. The additives are in electrically conductive contact with one another, in order to form the electrically conductive layer. The substrate is formed from a glass or glass-ceramic material or a composite material having a glass and/or glass-ceramic. The additives are embedded in a matrix layer at least in some regions. The matrix layer is formed by a transparent matrix material. In order to make such a transparent electrical conductor useful, particularly for application in a display, as a touch sensor, or the like for cooking surfaces, the transparent electrical conductor exhibits a temperature resistance of at least 140° C. The additives are dispersed in a matrix material, which is applied as a coating material onto the substrate in one coating step.

Each of these references are herein incorporated by reference for all that they disclose.

SUMMARY

In one embodiment, a capacitance module may include a sensor layer having a set of electrodes; a component layer having a controller in communication with the set of electrodes; a shield layer positioned between the sensor layer and the component layer; and antenna disposed on the component layer; and anti-warping segments adjacent to the antenna and disposed on the component layer, where the anti-warping segments are electrically isolated from each other.

The anti-warping segments may have the characteristic of causing the component layer to have a closer coefficient of thermal expansion to the shield layer.

The anti-warping segments may have the characteristic of minimizing a formation of eddy currents when the antenna is activated.

The characteristic of the anti-warping segments that reduces the eddy currents may be a size of less than one square centimeter.

The characteristic of the anti-warping segments that reduces the eddy currents may be a size of less than one half square centimeter.

The characteristic of the anti-warping segments that reduces the eddy currents may be a size of less than one third square centimeter.

The characteristic of the anti-warping segments that reduces the eddy currents may be a size of less than one fourth square centimeter.

The antenna may be a near field communication antenna.

The antenna may be a Wi-Fi antenna.

The anti-warping segments may be positioned around the exterior of the antenna on the component layer.

The antenna may be positioned around the anti-warping segments on the component layer.

The ratio between the gap between the anti-warping segments and the size of the anti-warping segments may be configured to optimize thermal expansion characteristics.

The anti-warping segments may be segmented in a first direction aligned to the length of the component layer.

The anti-warping segments may be segmented in a second direction transverse to the length of the component layer.

The anti-warping segments may include a medial set of segments that surround the antenna and a distal set of segments that surrounds the medial set.

The medial set of segments and the distal set of segments may be offset from each other such that gaps between segments of the medial set do not align with gaps between segments of the distal set.

The anti-warping segments may be arranged in a symmetrical pattern around the antenna.

The anti-warping segments may be spaced equidistantly from the antenna.

The antenna may for a continuous loop around the anti-warping segments.

The anti-warping segments may be arranged in a grid pattern within the area surrounded by the antenna.

The anti-warping segments may be composed of a copper alloy.

The anti-wrapping segments may be positioned between the antenna and the controller.

In another embodiment, a portal electronic device may include a sensor layer having a set of electrodes; a component layer having a controller in communication with the set of electrodes; a shield layer positioned between the sensor layer and the component layer; an antenna disposed on the component layer; anti-warping segments adjacent to the antenna and disposed on the component layer; where the anti-warping segments are electrically isolated from each other; and the anti-warping segments have the characteristic of causing the component layer to have a closer coefficient of thermal expansion to the shield layer.

The component layer may be part of a touch-sensitive device.

Figure 1:
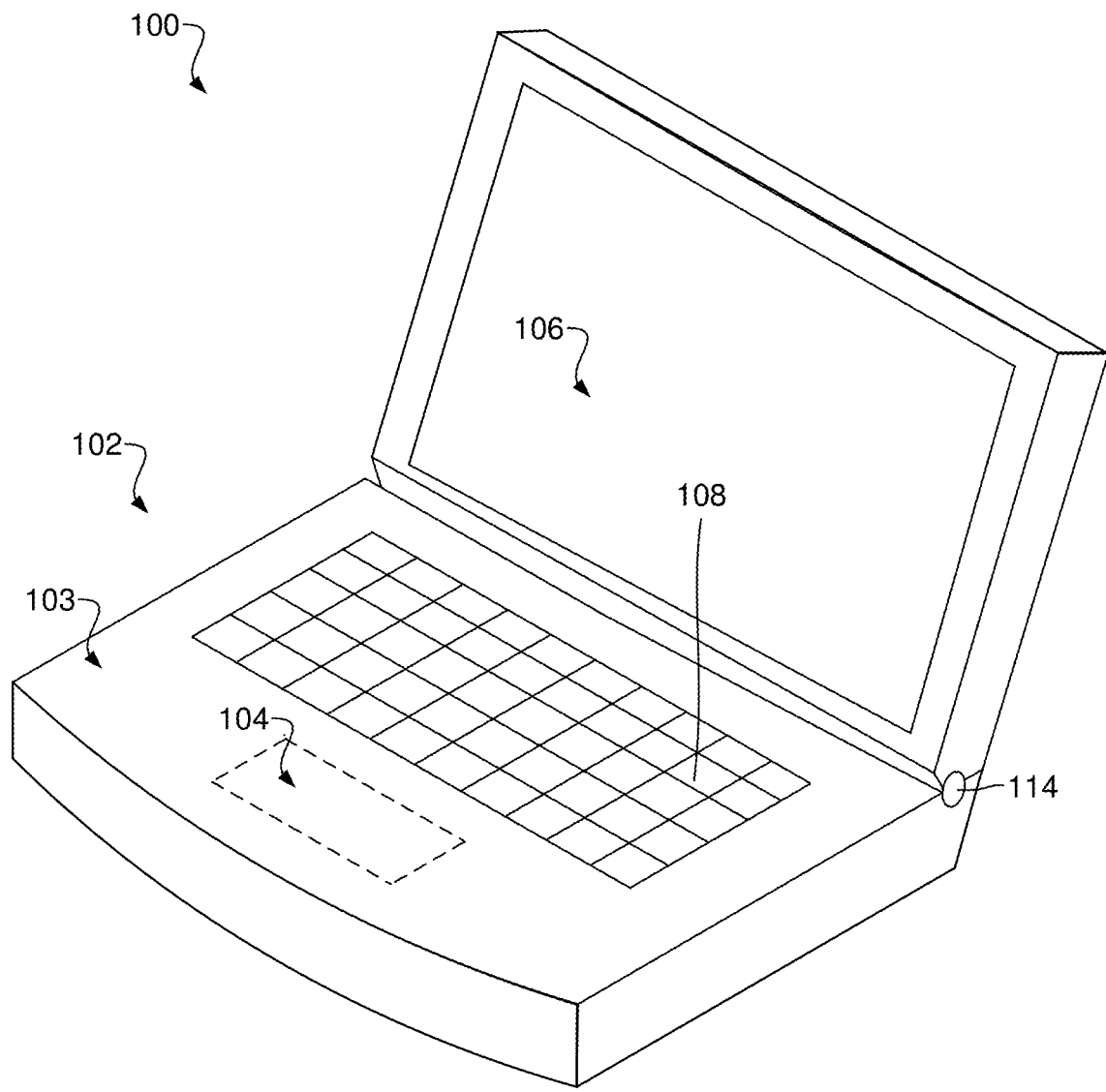
FIG. 1 depicts an example of an electronic device in accordance with the disclosure.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION OF THE INVENTION

This description provides examples, and is not intended to limit the scope, applicability, or configuration of the invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted, or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

For purposes of this disclosure, the term "aligned" generally refers to being parallel, substantially parallel, or forming an angle of less than 35.0 degrees. For purposes of this disclosure, the term "transverse" generally refers to perpendicular, substantially perpendicular, or forming an angle between 55.0 and 125.0 degrees. For purposes of this disclosure, the term "length" generally refers to the longest dimension of an object. For purposes of this disclosure, the term "width" generally refers to the dimension of an object from side to side and may refer to measuring across an object perpendicular to the object's length.

For purposes of this disclosure, the term "electrode" may generally refer to a portion of an electrical conductor intended to be used to make a measurement, and the terms "route" and "trace" generally refer to portions of an electrical conductor that are not intended to make a measurement. For purposes of this disclosure in reference to circuits, the term "line" generally refers to the combination of an electrode and a "route" or "trace" portions of the electrical conductor. For purposes of this disclosure, the term "Tx" generally refers to a transmit line, electrode, or portions thereof, and the term "Rx" generally refers to a sense line, electrode, or portions thereof.

For the purposes of this disclosure, the term "electronic device" may generally refer to devices that can be transported and include a battery and electronic components. Examples may include a laptop, a desktop, a mobile phone, an electronic tablet, a personal digital device, a watch, a gaming controller, a gaming wearable device, a wearable device, a measurement device, an automation device, a security device, a display, a computer mouse, a vehicle, an infotainment system, an audio system, a control panel, another type of device, an athletic tracking device, a tracking device, a card reader, a purchasing station, a kiosk, or combinations thereof.

For the purposes of this disclosure, the term "warping" may generally refer to stresses between layers that are heat induced. Such warping may cause visual changes such as bending, twisting, other shape changes, delamination between layers, or other deformities in the capacitance module. In other examples, the warping may result in internal stresses that are difficult to detect with the naked eye. Such heat induced internal stresses may place stress on components of the capacitance module that may interfere with the operation of the internal components and/or lower with the effective life of the components.

It should be understood that use of the terms "capacitance module," "touch pad" and "touch sensor" throughout this document may be used interchangeably with "capacitive touch sensor," "capacitive sensor," "capacitance sensor," "capacitive touch and proximity sensor," "proximity sensor," "touch and proximity sensor," "touch panel," "trackpad," "touch pad," and "touch screen." The capacitance module may be incorporated into an electronic device.

It should also be understood that, as used herein, the terms "vertical," "horizontal," "lateral," "upper," "lower," "left," "right," "inner," "outer," etc., can refer to relative directions or positions of features in the disclosed devices and/or assemblies shown in the Figures. For example, "upper" or "uppermost" can refer to a feature positioned closer to the top of a page than another feature. These terms, however, should be construed broadly to include devices and/or assemblies having other orientations, such as inverted or inclined orientations where top/bottom, over/under, above/below, up/down, and left/right can be interchanged depending on the orientation.

In some cases, the capacitance module is located within a housing. The capacitance module may be underneath the housing and capable of detecting objects outside of the housing. In examples, where the capacitance module can detect changes in capacitance through a housing, the housing is a capacitance reference surface. For example, the capacitance module may be disclosed within a cavity formed by a keyboard housing of a computer, such as a laptop or other type of computing device, and the sensor may be disposed underneath a surface of the keyboard housing. In such an example, the keyboard housing adjacent to the capacitance module is the capacitance reference surface. In some examples, an opening may be formed in the housing, and an overlay may be positioned within the opening. In this example, the overlay is the capacitance reference surface. In such an example, the capacitance module may be positioned adjacent to a backside of the overlay, and the capacitance module may sense the presence of the object through the thickness of the overlay. For the purposes of this disclosure, the term "reference surface" may generally refer to a surface through which a pressure sensor, a capacitance sensor, or another type of sensor is positioned to sense a pressure, a presence, a position, a touch, a proximity, a capacitance, a magnetic property, an electric property, another type of property, or another characteristic, or combinations thereof that indicates an input. For example, the reference surface may be a housing, an overlay, or another type of surface through which the input is sensed. In some examples, the reference surface has no moving parts. In some examples, the reference surface may be made of any appropriate type of material, including, but not limited to, plastics, glass, a dielectric material, a metal, another type of material, or combinations thereof.

For the purposes of this disclosure, the term "display" may generally refer to a display or screen that is not depicted in the same area as the capacitive reference surface. In some cases, the display is incorporated into a laptop where a keyboard is located between the display and the capacitive reference surface. In some examples where the capacitive reference surface is incorporated into a laptop, the capacitive reference surface may be part of a touch pad. Pressure sensors may be integrated into the stack making up the capacitance module. However, in some cases, the pressure sensors may be located at another part of the laptop, such as under the keyboard housing, but outside of the area used to sense touch inputs, on the side of the laptop, above the keyboard, to the side of the keyboard, at another location on the laptop, or at another location. In examples where these principles are integrated into a laptop, the display may be pivotally connected to the keyboard housing. The display may be a digital screen, a touch screen, another type of screen, or combinations thereof. In some cases, the display is located on the same device as the capacitive reference surface, and in other examples, the display is located on another device that is different from the device on which the capacitive reference surface is located. For example, the display may be projected onto a different surface, such as a wall or projector screen. In some examples, the reference surface may be located on an input or gaming controller, and the display is located on a wearable device, such as a virtual reality or augmented reality screen. In some cases, the reference surface and the display are located on the same surface, but on separate locations on that surface. In other examples, the reference surface and the display may be integrated into the same device, but on different surfaces. In some cases, the reference surface and the display may be oriented at different angular orientations with respect to each other.

FIG. 1 depicts an example of an electronic device 100. In this example, the electronic device is a laptop. In the illustrated example, the electronic device 100 includes input components, such as a keyboard 102 and a capacitive module, such as a touch pad 104, that are incorporated into a housing 103. The electronic device 100 also includes a display 106. A program operated by the electronic device 100 may be depicted in the display 106 and controlled by a sequence of instructions that are provided by the user through the keyboard 102 and/or through the touch pad 104. An internal battery (not shown) may be used to power the operations of the electronic device 100.

The keyboard 102 includes an arrangement of keys 108 that can be individually selected when a user presses on a key with a sufficient force to cause the key 108 to be depressed towards a switch located underneath the keyboard 102. In response to selecting a key 108, a program may receive instructions on how to operate, such as a word processing program determining which types of words to process. A user may use the touch pad 104 to give different types of instructions to the programs operating on the computing device 100. For example, a cursor depicted in the display 106 may be controlled through the touch pad 104. A user may control the location of the cursor by sliding his or her hand along the surface of the touch pad 104. In some cases, the user may move the cursor to be located at or near an object in the computing device's display and give a command through the touch pad 104 to select that object. For example, the user may provide instructions to select the object by tapping the surface of the touch pad 104 one or more times.

The touch pad 104 is a capacitance module that includes a stack of layers disposed underneath the keyboard housing, underneath an overlay that is fitted into an opening of the keyboard housing, or underneath another capacitive reference surface. In some examples, the capacitance module is located in an area of the keyboard's surface where the user's palms may rest while typing. The capacitance module may include a substrate, such as a printed circuit board or another type of substrate. One of the layers of the capacitance module may include a sensor layer that includes a first set of electrodes oriented in a first direction and a second layer of electrodes oriented in a second direction that is transverse the first direction. These electrodes may be spaced apart and/or electrically isolated from each other. The electrical isolation may be accomplished by depositing at least a portion of the electrodes on different sides of the same substrate or providing dedicated substrates for each set of electrodes. Capacitance may be measured at the overlapping intersections between the different sets of electrodes. However, as an object with a different dielectric value than the surrounding air (e.g., finger, stylus, etc.) approach the intersections between the electrodes, the capacitance between the electrodes may change. This change in capacitance and the associated location of the object in relation to the capacitance module may be calculated to determine where the user is touching or hovering the object within the detection range of the capacitance module. In some examples, the first set of electrodes and the second set of electrodes are equidistantly spaced with respect to each other. Thus, in these examples, the sensitivity of the capacitance module is the same in both directions. However, in other examples, the distance between the electrodes may be non-uniformly spaced to provide greater sensitivity for movements in certain directions.

In some cases, the display 106 is mechanically separate and movable with respect to the keyboard with a connection mechanism 114. In these examples, the display 106 and keyboard 102 may be connected and movable with respect to one another. The display 106 may be movable within a range of 0 degrees to 180 degrees or more with respect to the keyboard 102. In some examples, the display 106 may fold over onto the upper surface of the keyboard 102 when in a closed position, and the display 106 may be folded away from the keyboard 102 when the display 106 is in an operating position. In some examples, the display 106 may be orientable with respect to the keyboard 102 at an angle between 35 to 135 degrees when in use by the user. However, in these examples, the display 106 may be positionable at any angle desired by the user.

In some examples, the display 106 may be a non-touch sensitive display. However, in other examples at least a portion of the display 106 is touch sensitive. In these examples, the touch sensitive display may also include a capacitance module that is located behind an outside surface of the display 106. As a user's finger or other object approaches the touch sensitive screen, the capacitance module may detect a change in capacitance as an input from the user.

While the example of FIG. 1 depicts an example of the electronic device being a laptop, the capacitance sensor and touch surface may be incorporated into any appropriate device. A non-exhaustive list of devices includes, but is not limited to, a desktop, a display, a screen, a kiosk, a computing device, an electronic tablet, a smart phone, a location sensor, a card reading sensor, another type of electronic device, another type of device, or combinations thereof.

Figure 2:
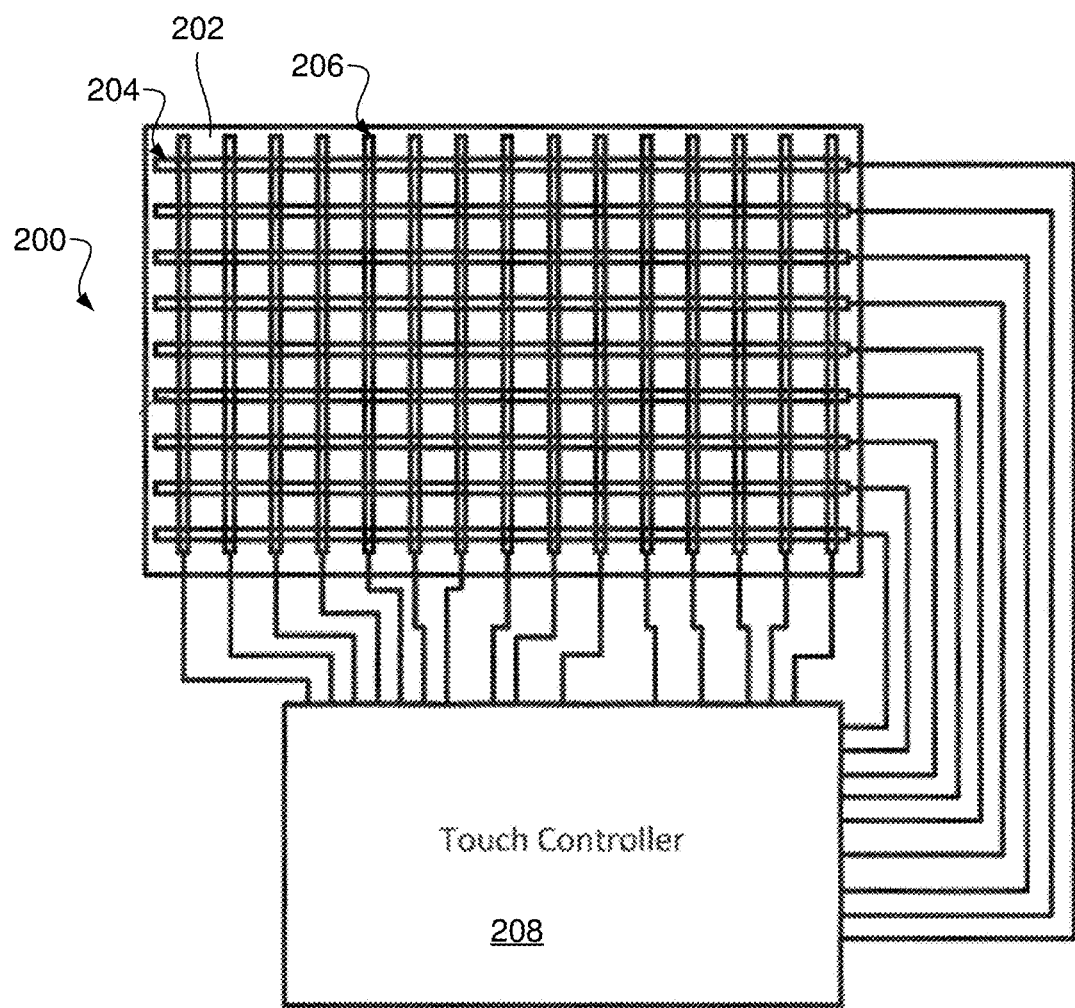
FIG. 2 depicts an example of a substrate with a first set of electrodes and a second set of electrodes in accordance with the disclosure.

FIG. 2 depicts an example of a portion of a capacitance module 200. In this example, the capacitance module 200 may include a substrate 202, first set 204 of electrodes, and a second set 206 of electrodes. The first and second sets 204, 206 of electrodes may be oriented to be transverse to each other. Further, the first and second sets 204, 206 of electrodes may be electrically isolated from one another so that the electrodes do not short to each other. However, where electrodes from the first set 204 overlap with electrodes from the second set 206, capacitance can be measured. The capacitance module 200 may include one or more electrodes in the first set 204 or the second set 206. Such a substrate 202 and electrode sets may be incorporated into a touch screen, a touch pad, a location sensor, a gaming controller, a button, and/or detection circuitry.

In some examples, the capacitance module 200 is a mutual capacitance sensing device. In such an example, the substrate 202 has a set 204 of row electrodes and a set 206 of column electrodes that define the touch/proximity-sensitive area of the component. In some cases, the component is configured as a rectangular grid of an appropriate number of electrodes (e.g., 8-by-6, 16-by-12, 9-by-15, or the like).

As shown in FIG. 2, the capacitance module 208 includes a capacitance controller 208. The capacitance controller 208 may include at least one of a central processing unit (CPU), a digital signal processor (DSP), an analog front end (AFE) including amplifiers, a peripheral interface controller (PIC), another type of microprocessor, and/or combinations thereof, and may be implemented as an integrated circuit, a field programmable gate array (FPGA), an application specific integrated circuit (ASIC), a combination of logic gate circuitry, other types of digital or analog electrical design components, or combinations thereof, with appropriate circuitry, hardware, firmware, and/or software to choose from available modes of operation.

In some cases, the capacitance controller 208 includes at least one multiplexing circuit to alternate which of the sets 204, 206 of electrodes are operating as drive electrodes and sense electrodes. The driving electrodes can be driven one at a time in sequence, or randomly, or drive multiple electrodes at the same time in encoded patterns. Other configurations are possible such as a self-capacitance mode where the electrodes are driven and sensed simultaneously. Electrodes may also be arranged in non-rectangular arrays, such as radial patterns, linear strings, or the like. A shield layer (see FIG. 3) may be provided beneath the electrodes to reduce noise or other interference. The shield may extend beyond the grid of electrodes. Other configurations are also possible.

In some cases, no fixed reference point is used for measurements. The touch controller 208 may generate signals that are sent directly to the first or second sets 204, 206 of electrodes in various patterns.

In some cases, the component does not depend upon an absolute capacitive measurement to determine the location of a finger (or stylus, pointer, or other object) on a surface of the capacitance module 200. The capacitance module 200 may measure an imbalance in electrical charge to the electrode functioning as a sense electrode which can, in some examples, be any of the electrodes designated in either set 204, 206 or, in other examples, with dedicated-sense electrodes. When no pointing object is on or near the capacitance module 200, the capacitance controller 208 may be in a balanced state, and there is no signal on the sense electrode. When a finger or other pointing object creates imbalance because of capacitive coupling, a change in capacitance may occur at the intersections between the sets of electrodes 204, 206 that make up the touch/proximity sensitive area. In some cases, the change in capacitance is measured. However, in alternative example, the absolute capacitance value may be measured.

While this example has been described with the capacitance module 200 having the flexibility of the switching the sets 204, 206 of electrodes between sense and transmit electrodes, in other examples, each set of electrodes is dedicated to either a transmit function or a sense function.

Figure 3:
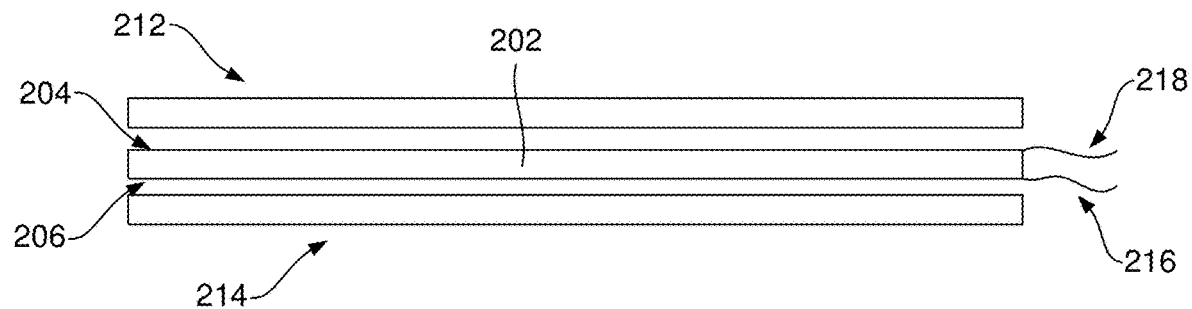
FIG. 3 depicts an example of a touch pad in accordance with the disclosure.

FIG. 3 depicts an example of a substrate 202 with a first set 204 of electrodes and a second set 206 of electrodes deposited on the substrate 202 that is incorporated into a capacitance module. The first set 204 of electrodes and the second set 206 of electrodes may be spaced apart from each other and electrically isolated from each other. In the example depicted in FIG. 3, the first set 204 of electrodes is deposited on a first side of the substrate 202, and the second set 206 of electrodes is deposited on the second side of the substrate 202, where the second side is opposite the first side and spaced apart by the thickness of the substrate 202. The substrate may be made of an electrically insulating material thereby preventing the first and second sets 204, 206 of electrodes from shorting to each other. As depicted in FIG. 2, the first set 204 of electrodes and the second set 206 of electrodes may be oriented transversely to one another. Capacitance measurements may be taken where the intersections with the electrodes from the first set 204 and the second set 206 overlap. In some examples, a voltage may be applied to the transmit electrodes and the voltage of a sense electrode that overlaps with the transmit electrode may be measured. The voltage from the sense electrode may be used to determine the capacitance at the intersection where the sense electrode overlaps with the transmit electrode.

In the example of FIG. 3 depicting a cross section of a capacitance module, the substrate 202 may be located between a capacitance reference surface 212 and a shield 214. The capacitance reference surface 212 may be a covering that is placed over the first side of the substrate 202 and that is at least partially transparent to electric fields. As a user's finger or stylus approach the capacitance reference surface 212, the presence of the finger or the stylus may affect the electric fields on the substrate 202. With the presence of the finger or the stylus, the voltage measured from the sense electrode may be different than when the finger or the stylus are not present. As a result, the change in capacitance may be measured.

The shield 214 may be an electrically conductive layer that shields electric noise from the internal components of the electronic device. This shield may prevent influence on the electric fields on the substrate 202. In some cases, the shield is solid piece of material that is electrically conductive. In other cases, the shield has a substrate and an electrically conductive material disposed on at least one substrate. In some embodiments, the shield layer is positioned between the capacitance electrodes and the component layer to prevent electric fields generated by the components on the component layer from influencing the capacitance electrodes. In some embodiments, the shield layer is positioned between the capacitance electrodes and a battery that is separate from the capacitance module, but is intended to be positioned adjacent to the capacitance module. In this example, the shield may prevent electric fields generated by the battery from influencing the capacitance electrodes. In yet other examples, the shield is layer in the touch pad that performs a function and also shields the electrodes from electrically interfering noise. For example, in some examples, a pixel layer in display applications may form images that are visible through the capacitance reference surface, but also shields the electrodes from the electrical noise.

The voltage applied to the transmit electrodes may be carried through an electrical connection 216 from the touch controller 208 to the appropriate set of electrodes. The voltage applied to the sense electrode through the electric fields generated from the transmit electrode may be detected through the electrical connection 218 from the sense electrodes to the touch controller 208.

While the example of FIG. 3 has been depicted as having both sets of electrodes deposited on a substrate, one set of electrodes deposited on a first side and a second set of electrodes deposited on a second side; in other examples, each set of electrodes may be deposited on its own dedicated substrate.

Further, while the examples above describe a touch pad with a first set of electrodes and a second set of electrodes; in some examples, the capacitance module has a single set of electrodes. In such an example, the electrodes of the sensor layer may function as both the transmit and the receive electrodes. In some cases, a voltage may be applied to an electrode for a duration of time, which changes the capacitance surrounding the electrode. At the conclusion of the duration of time, the application of the voltage is discontinued. Then a voltage may be measured from the same electrode to determine the capacitance. If there is no object (e.g., finger, stylus, etc.) on or in the proximity of the capacitance reference surface, then the measured voltage off of the electrode after the voltage is discontinued may be at a value that is consistent with a baseline capacitance. However, if an object is touching or in proximity to the capacitance reference surface, then the measured voltage may indicate a change in capacitance from the baseline capacitance.

In some examples, the capacitance module has a first set of electrodes and a second set of electrodes and is in communication with a controller that is set up to run both mutual capacitance measurements (e.g., using both the first set and the second set of electrodes to take a capacitance measurement) or self-capacitance measurements (e.g., using just one set of electrodes to take a capacitance measurement).

Figure 4:
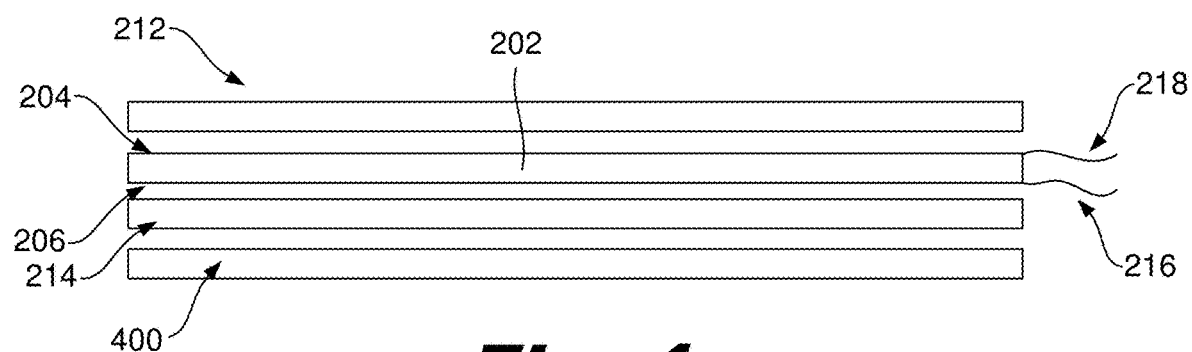
FIG. 4 depicts an example of a touch screen in accordance with the disclosure.

FIG. 4 depicts an example of a capacitance module incorporated into a touch screen. In this example, the substrate 202, sets of electrodes 204, 206, and electrical connections 216, 218 may be similar to the arrangement described in conjunction with FIG. 3. In the example of FIG. 4, the shield 214 is located between the substrate 202 and a display layer 400. The display layer 400 may be a layer of pixels or diodes that illuminate to generate an image. The display layer may be a liquid crystal display, a light emitting diode display, an organic light emitting diode display, an electroluminescent display, a quantum dot light emitting diode display, an incandescent filaments display, a vacuum florescent display, a cathode gas display, another type of display, or combinations thereof. In this example, the shield 214, the substrate 202, and the capacitance reference surface 212 may all be at least partially optically transparent to allow the image depicted in the display layer to be visible to the user through the capacitance reference surface 212. Such a touch screen may be included in a monitor, a display assembly, a laptop, a mobile phone, a mobile device, an electronic tablet, a dashboard, a display panel, an infotainment device, another type of electronic device, or combinations thereof.

Figure 5:
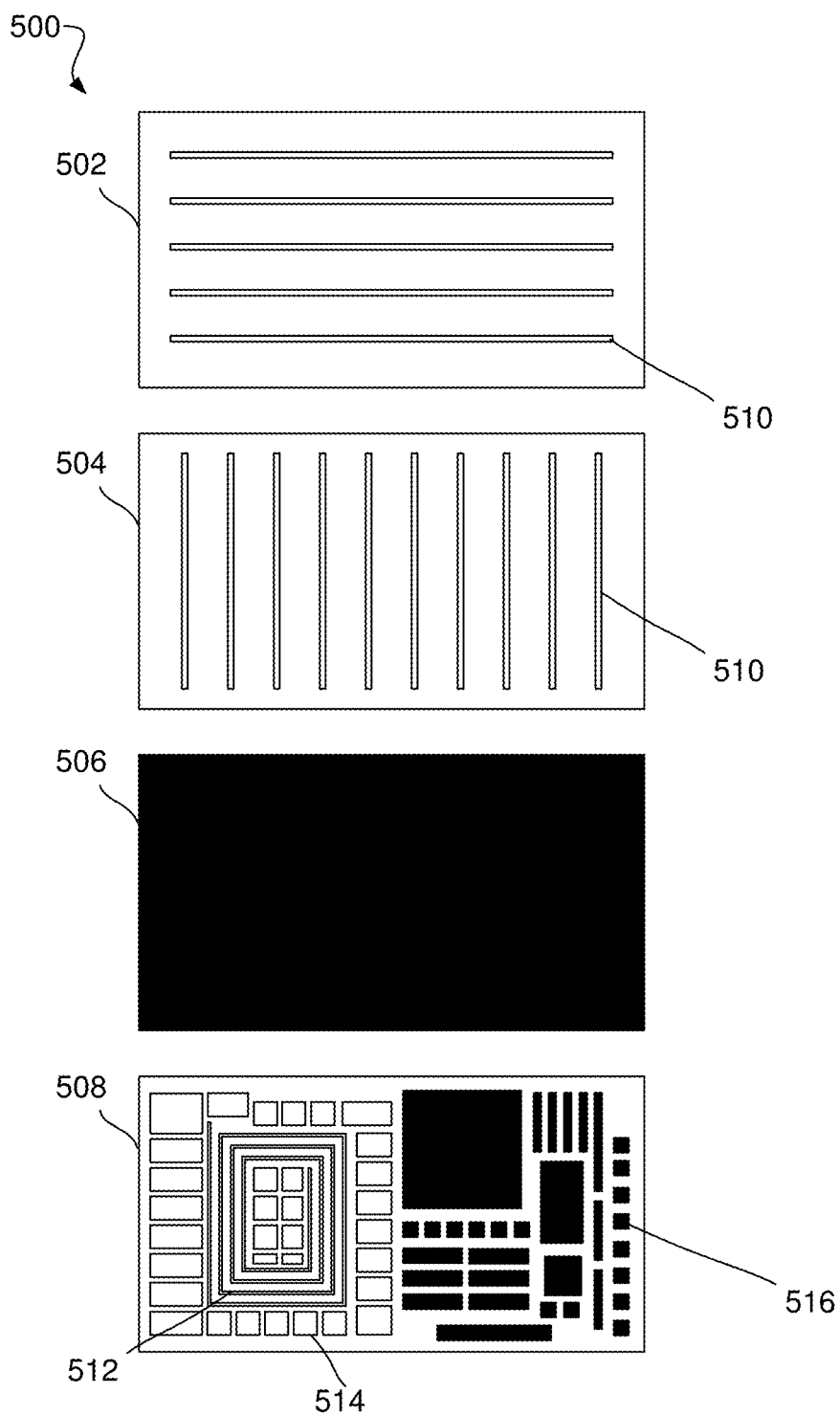
FIG. 5 depicts an example of a stack of layers in accordance with the disclosure.

FIG. 5 depicts an example of a stack of layers in accordance with the disclosure. In this example, a capacitance module 500 includes a first sensor layer 502, a second sensor layer 504, a shield layer 506, and a component layer 508. While the capacitance module 500 in this example includes four layers, in other examples, a capacitance module may include a different number of layers. For example, a capacitance module may include three layers, five layers, or a different number of layers.

The first sensor layer 502 and the second sensor layer 504 may be located adjacent to one another. While this example depicts two sensor layers 502, 504, in other examples, a capacitance module may include just a single sensor layer.

The sensor layers 502, 504 may include a set 510 of electrodes each which may be used in a capacitance circuit to detect and/or measure changes in capacitance. In this example, the sensor layer 504 includes one set 510 of electrodes. In other examples, a sensor layer may include two sets of electrodes, three sets of electrodes, or a different number of sets of electrodes. The set 510 of electrodes may operate using self-capacitance. In other examples, electrodes on a sensor layer may operate using self-capacitance, mutual capacitance, or combinations thereof.

The shield layer 506 is located adjacent to the sensor layer 504 within the capacitance module 500. In other examples, a shield layer may be in another location relative to other layers in a stack.

The shield layer 506 may be made of a material which blocks or reduces electromagnetic and/or electrical interference. A shield layer may be made of a conductive material such as copper, aluminum, silver, or combinations thereof. A shield layer may be made of a composite material such as plastic, glass, another composite structure, or combinations thereof. A shield layer may be a conductive coating applied to a substrate, such as indium tin oxide (ITO), graphene, a conductive polymer, another coating, or combinations thereof. In some cases, the shield layer may be made of a magnetic material, such as iron, ferrite, another metal, composites thereof, alloys thereof, mixtures thereof, or combinations thereof.

In this example, the shield layer 506 is implemented with a single material. In other examples, a shield layer may be implemented differently. Different implementations of shield layers may offer specific advantages. For example, a shield layer may be implemented as a hatched shield, where a grid or mesh pattern of conductive material is used. Such an implementation may reduce the weight and/or cost of a shield layer while still providing adequate shielding. In another example, a shield layer may be implemented in segments, where sections of conductive material are interspersed with non-conductive gaps. Such an implementation may allow for flexibility in the construction and layout of the capacitance module, potentially improving thermal management and accommodating complex component configurations within the electronic device.

In this example, the shield layer 506 is located between the sensor layer 504 and the component layer 508. The shield layer 506 may help prevent electromagnetic interference originating from components 516 on the component layer 508 or sources external to the capacitance module from interfering with the set 510 of electrodes on the sensor layers 502, 504.

Shielding the sensor layer 504 with the shield layer 506 may improve the accuracy and stability of capacitance measurements measured by the set 510 of electrodes. Shielding the sensor layer 504 may also reduce noise, which may increase the sensitivity and accuracy of user inputs on the capacitance module. The shield layer 506 may be positioned to block interference from a battery, power sources, memory resources, processing resources, electronic components, other components, or combinations thereof that may be positioned within a cavity of the electronic device.

In this example, the component layer 508 is adjacent to the shield layer 506. In other examples, a component layer may be in another location relative to other layers in a stack or parts of a capacitance module. The component layer 508 includes an antenna 512, anti-warping segments 514, and other components 516.

Components 516 included on the component layer 508 may facilitate the functionality of the capacitance module 500. Components on a component layer may include a central processing unit (CPU), a microcontroller, an op-amp, a memory unit, a field-programmable gate array (FPGA), a graphics processing unit (GPU), an interface controller, a power management integrated circuit, processing resources, an antenna, another type of component, or combinations thereof.

The antenna 512 may facilitate wireless communication according to a near field communication (NFC) protocol, a wi-fi protocol, a short-range wireless protocol, another wireless protocol, or combinations thereof.

In this example, the component layer 508 includes one antenna 512. In other examples, a layer in a capacitance module may include more than one antenna.

The antenna 512 may be constructed from a highly conductive material to maximize efficiency in signal transmission and reception. In some examples, an antenna may be made of copper, silver, gold, another conductive material, composites thereof, mixtures thereof, alloys thereof, or combinations thereof.

In some examples, the antenna 512 may be deposited on the component layer 508. In other examples, the antenna 512 may be etched into the component layer 508 via a photolithographic process or the like.

An antenna may have a coil shape, dipole shape, another type of shape, or combinations thereof. The shape of an antenna may correspond to the wireless protocol the antenna is configured to transmit. In this example, the antenna 512 has a coil shape, which may be used to transmit a wireless signal according to the NFC protocol.

Anti-warping segments 514 may be included on the component layer 508. In this example, the anti-warping segments 514 are located around the antenna 512 and within the area surrounded by the antenna's coil shape.

The capacitance module 500 may be exposed to heat during its manufacturing process. As heat is applied, any part of the capacitance module 500 may expand according to each part's coefficient of thermal expansion (CTE). When heat is applied to the capacitance module 500, parts of the capacitance module with different CTEs may expand at uneven rates. The material of the anti-warping segments 514 may be determined, in part, by the material of the shield layer 506 and the material of the component layer 508. In particular, the material of the anti-warping segments 514 may be selected, in part, by the CTE of the shield layer 506 and the CTE of the component layer 508. The material of the anti-warping segments 514 may be determined such that the overall CTE of the component layer 508 is closer to the CTE of the shield layer 506. The inclusion of anti-warping segments 514 on the component layer 508 may cause the component layer to have a closer CTE to the CTE of the shield layer 506. The inclusion of anti-warping segments 514 on the component layer 508 may help to ensure that the component layer and shield layer 506 expand at the same rate when exposed to heat, preventing the capacitance module 500 from warping and/or delaminating.

In this example, the component layer 514 includes several anti-warping segments. In some examples, anti-warping segments may be included in multiple areas of a component layer that are free from other components. Including several anti-warping segments may further reduce the propensity for warping and/or delamination in a capacitance module.

Some of the components 516 may be spaced away from the antenna at a distance to prevent the formation of eddy currents in the components 516. Within this distance, it may be less efficient to place the components. Thus, this distance may be otherwise unoccupied with components, which may result in this distance having a more pronounced CTE mismatch between the shield layer and the component layer. By filling in this distance with the anti-warping segments, the CTE mismatch may be reduced and/or eliminated.

In this example, the anti-warping segments 514 have a rectangular shape. In other examples, anti-warping segments may have a different shape.

The shape and size of anti-warping segments 514 on the component layer 508 may have an effect on the formation of eddy currents within the anti-warping segments. For example, in some embodiments, the size of the anti-warping segments that reduces the negative effects of eddy sufficiently be may less than one square centimeter. In other embodiments, the size may be less than one half square centimeter, less than one third square centimeter, less than one quarter square centimeter, less than one fifth square centimeter, another size, or combinations thereof.

For example, a component layer may include several electrically independent anti-warping segments to prevent a continuous flow of electrical current throughout the anti-warping segments. In another example, a component layer may include anti-warping segments with a non-circular shape to prevent a continuous flow of electrical current throughout the anti-warping segments. In these ways, the transfer of electrical power from the antenna 512 to the anti-warping segments 514 may be reduced and/or eliminated.

In some cases, the anti-warping segments 514 may also be a shield by partially preventing electromagnetic interference to the components 516 originating from the antenna 512 and vice versa.

Figure 6:
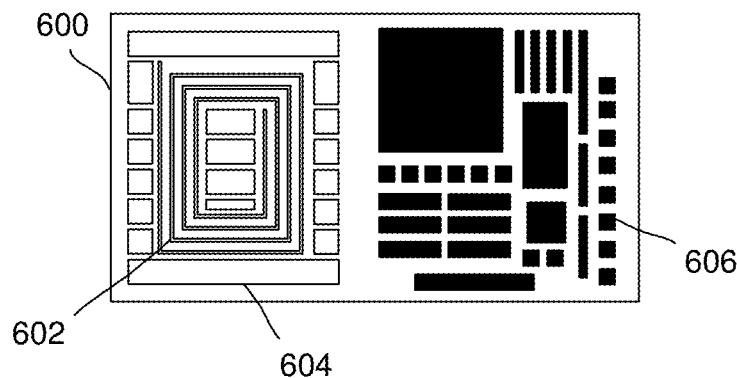
FIG. 6 depicts an example of a component layer in accordance with the disclosure.

FIG. 6 depicts an example of a component layer 600 with components 606 in accordance with the disclosure. In this example, the component layer 600 includes an antenna 602 and anti-warping segments 604. The anti-warping segments 604 may be disposed on the component layer 600 in an orientation aligned with a length of the antenna.

Figure 7:
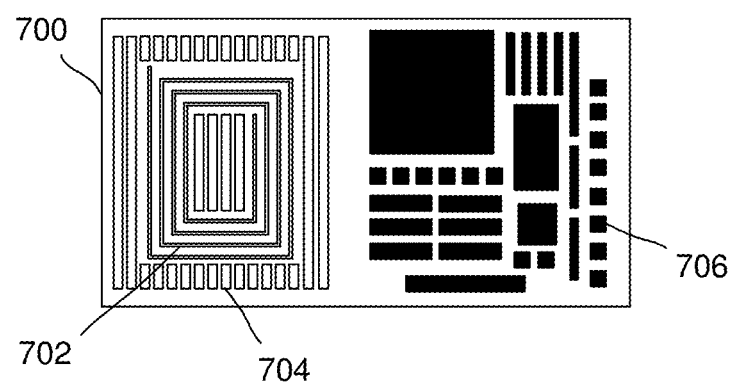
FIG. 7 depicts an example of a component layer in accordance with the disclosure.

FIG. 7 depicts an example of a component layer 700 with components 706 in accordance with the disclosure. In this example, the component layer 700 includes an antenna 702 and anti-warping segments 704. The anti-warping segments 704 may be disposed on the component layer 700 in an orientation that is aligned with a width of the antenna.

Figure 8:
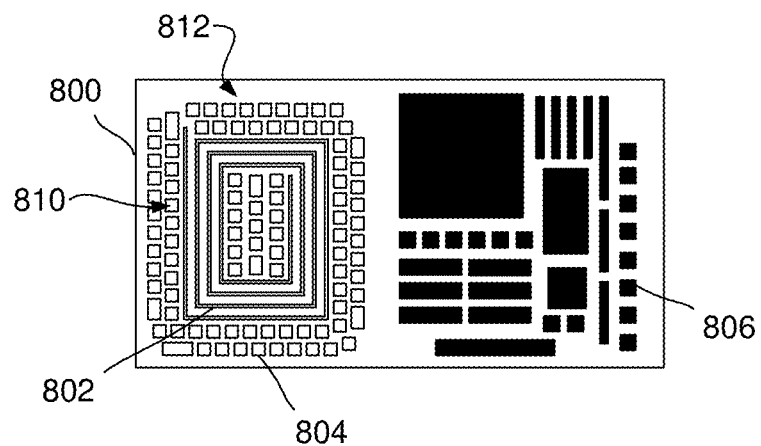
FIG. 8 depicts an example of a component layer in accordance with the disclosure.

FIG. 8 depicts an example of a component layer 800 with components 806 in accordance with the disclosure. In this example, an antenna 802 is surrounded by anti-warping segments 804. The anti-warping segments 804 are arranged in two rings around the antenna 802. A medial ring 810 may surround the antenna 802, and a distal ring 812 may surround the medial ring 810. While this example depicts the antenna surrounded by two segmented rings of anti-warp segments, additional rings may be used.

In some examples, the anti-warping segments are arranged in multiple rows about the outside of the antenna. In some examples, the rows of anti-warping segments are aligned with each other so that the gaps between the segments are aligned with each other. In other examples, the rows anti-warping segments are not aligned with each other, but are misaligned, so that the gaps between the anti-warping segments are off set from one another.

In some cases, the number of rows of anti-warping segments on a first side of the antenna are different than the number of rows on a second side of the antenna. In some examples, the first side of the antenna and the second side of the antenna are congruent sides and/or opposite sides.

In other embodiments, the anti-warping segments may be arranged in rows on the area defined by an inside of a coil antenna. The number of rows on the inside of the antenna may be different than the number of rows about the outside of the antenna.

In some examples, the anti-warping segments 804 are arranged such that the gaps between the segments do not overlap with each other. In examples where the gaps are off set each other (e.g., the gaps do not align) the anti-warping segments may reduce the gaps from having a long distance that is not covered by an anti-warping segment. Thus, the lengths of the gaps may be reduced while still separating the anti-warping segments so that they do not physically touch each other so that the segments remain electrically isolated from each other. Having the anti-warping segments remain electrically independent from each other may reduce formation of eddy currents within the anti-warping segments.

In some examples, a component layer may include anti-warping segments disposed outside an antenna's shape and within an antenna's shape. In other examples, a component layer may include anti-warping segments disposed only outside of an antenna's shape. In other examples, a component layer may include anti-warping segments disposed only within an antenna's shape. The location of anti-warping segments in regard to an antenna's shape may be based, in part, on the number of anti-warping segments needed to match the CTE of a component layer and shield layer and on the performance fidelity of an antenna. In some cases, the fidelity of an antenna may not be impacted by disposing anti-warping segments within its shape. In these cases, anti-warping segments may be disposed within the antenna's shape to better match the CTE of a shield layer and component layer. In other cases, anti-warping segments may be disposed only on the outside of antenna's shape to increase the fidelity of the antenna.

Figure 9:
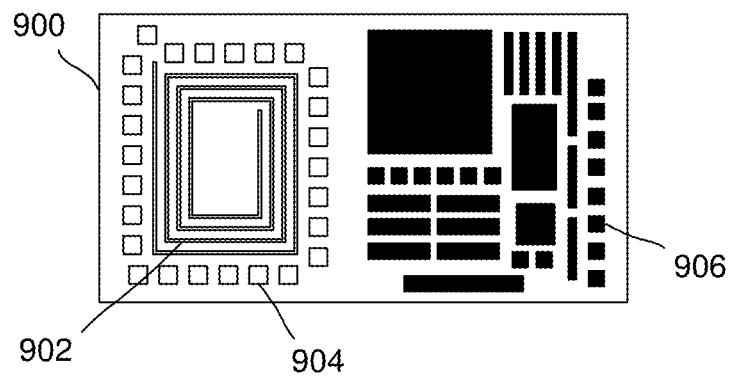
FIG. 9 depicts an example of a component layer in accordance with the disclosure.

FIG. 9 depicts an example of a component layer 900 with components 906 in accordance with the disclosure. In this example, an antenna 902 is surrounded with anti-warping segments 904 on the outside of the antenna. In this particular example, there are no anti-warping segments within a region defined by an inside of the antenna 902.

Figure 10:
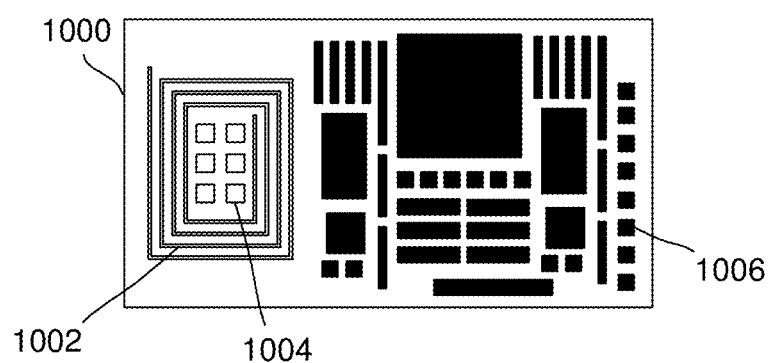
FIG. 10 depicts an example of a component layer in accordance with the disclosure.

FIG. 10 depicts an example of a component layer 1000 with components 1006 in accordance with the disclosure. In this example, an antenna 1006 surrounds anti-warping segments 1004 on the inside of the antenna's coil shape. In this particular example, there are no anti-warping segments near the outside of the antenna 1006.

Figure 11:
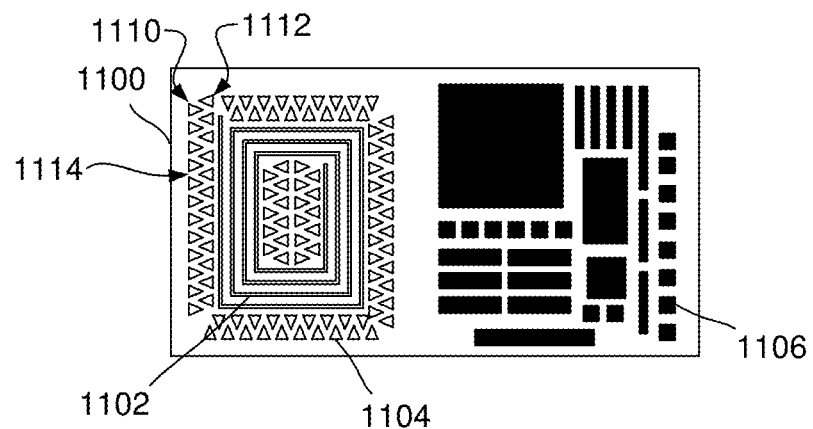
FIG. 11 depicts an example of a component layer in accordance with the disclosure.

FIG. 11 depicts an example of a component layer 1100 with components 1106 in accordance with the disclosure. In this example, an antenna 1102 is surrounded with anti-warping segments 1104 having triangular shapes. In some examples, the triangular shape of the anti-warping segments 1104 allow the segments on the medial ring 1110 to be offset from the segments in the distal ring 1112 while maintaining a more consistent gap 1114 between the segments. In some segment geometries, having a more consistent ratio of segment area to gap area between the segments allows the regions populated with the anti-warping segments to expand and shrink thermally at a more consistent rate. As such, the regions with the anti-warping segments may expand and contract more uniformly with the shield layer thereby reducing residual internal stresses between these layers as a result of inconsistent thermal expansion and contraction.

Figure 12:
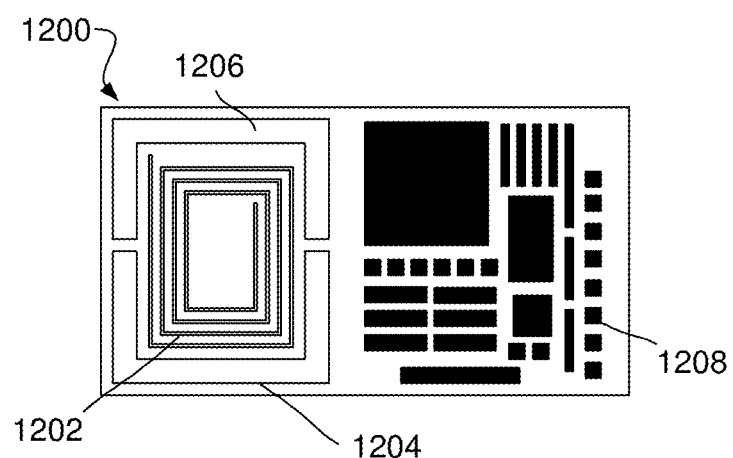
FIG. 12 depicts an example of a component layer in accordance with the disclosure.

FIG. 12 depicts an example of a component layer 1200 with components 1208 in accordance with the disclosure. In this example, an antenna 1202 is surrounded with anti-warping segments 1204, 1206. The anti-warping segments 1204 include two u-shaped segments 1204, 1206 which surround the antenna 1202 in a discontinuous ring with two discontinuities. The shape of the anti-warping segments 1204 may reduce the formation of eddy currents on the material of the anti-warping segments.

Figure 13:
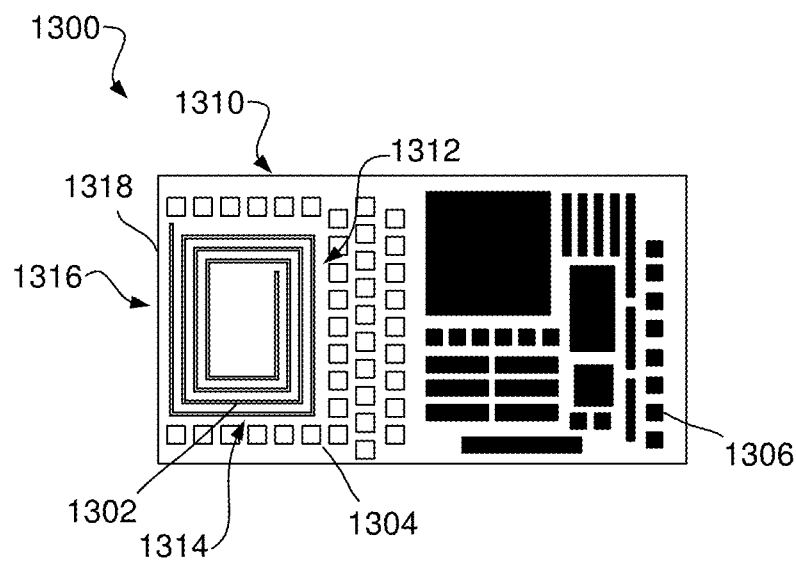
FIG. 13 depicts an example of a component layer in accordance with the disclosure.

FIG. 13 depicts an example of a component layer 1300 with components 1306 in accordance with the disclosure. In this example, an antenna 1302 is adjacent to anti-warping segments 1304 on three of its four sides. For example, the anti-warping segments 1304 are adjacent a first side 1310 of the antenna 1302, a second side 1312 of the antenna 1302, and a third side 1314 of the antenna 1302. In this example, a fourth side 1316 of the antenna 1302 is adjacent to an edge 1318 of the component layer 1300 with no anti-warping segments between the antenna 1302 and the fourth side 1316. This configuration of anti-warping segments may help match the CTE of a component layer and shield layer while also reducing the formation of eddy currents on the material of the segments.

Figure 14:
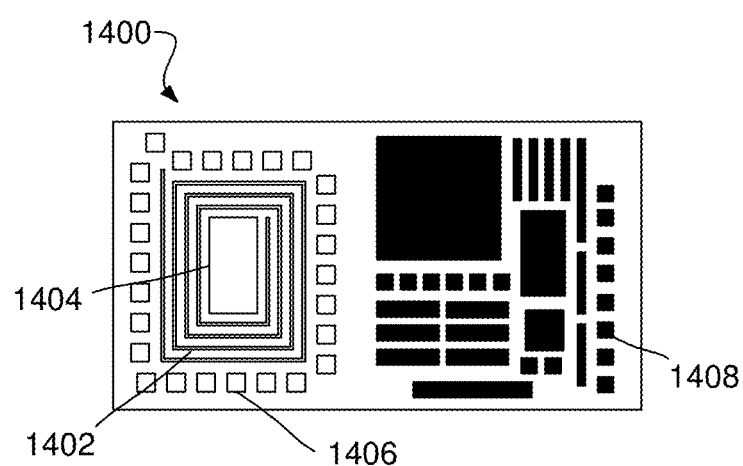
FIG. 14 depicts an example of a component layer in accordance with the disclosure.

FIG. 14 depicts an example of a component layer 1400 with components 1408 in accordance with the disclosure. In this example, an antenna 1402 is surrounded with a first set 1406 of anti-warping segments outside of the antenna's shape. A singular anti-warping segment 1404 is disposed within the antenna's 1402 shape.

Figure 15:
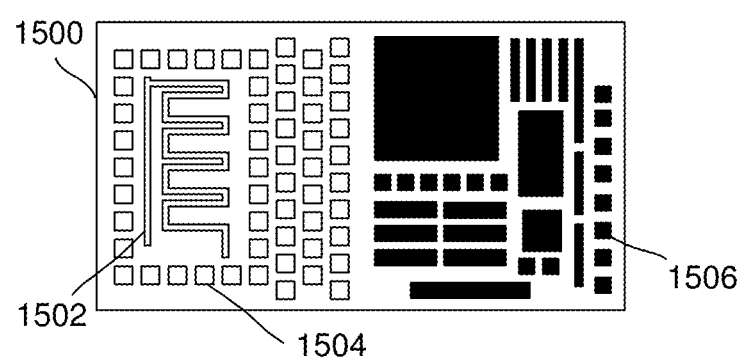
FIG. 15 depicts an example of a component layer in accordance with the disclosure.

FIG. 15 depicts an example of a component layer 1500 with components 1506 in accordance with the disclosure. In this example, an antenna 1502 is surrounded with anti-warping segments 1504. In this example, the antenna 1502 is a Wi-Fi antenna. The distribution of anti-warping segments 1504 may differ from the distribution of the anti-warping segments around a near field antenna to accommodate the shape, frequency, power level, inductive strength, electrical strength, and/or another characteristic of the antenna 1502.

Figure 16A:
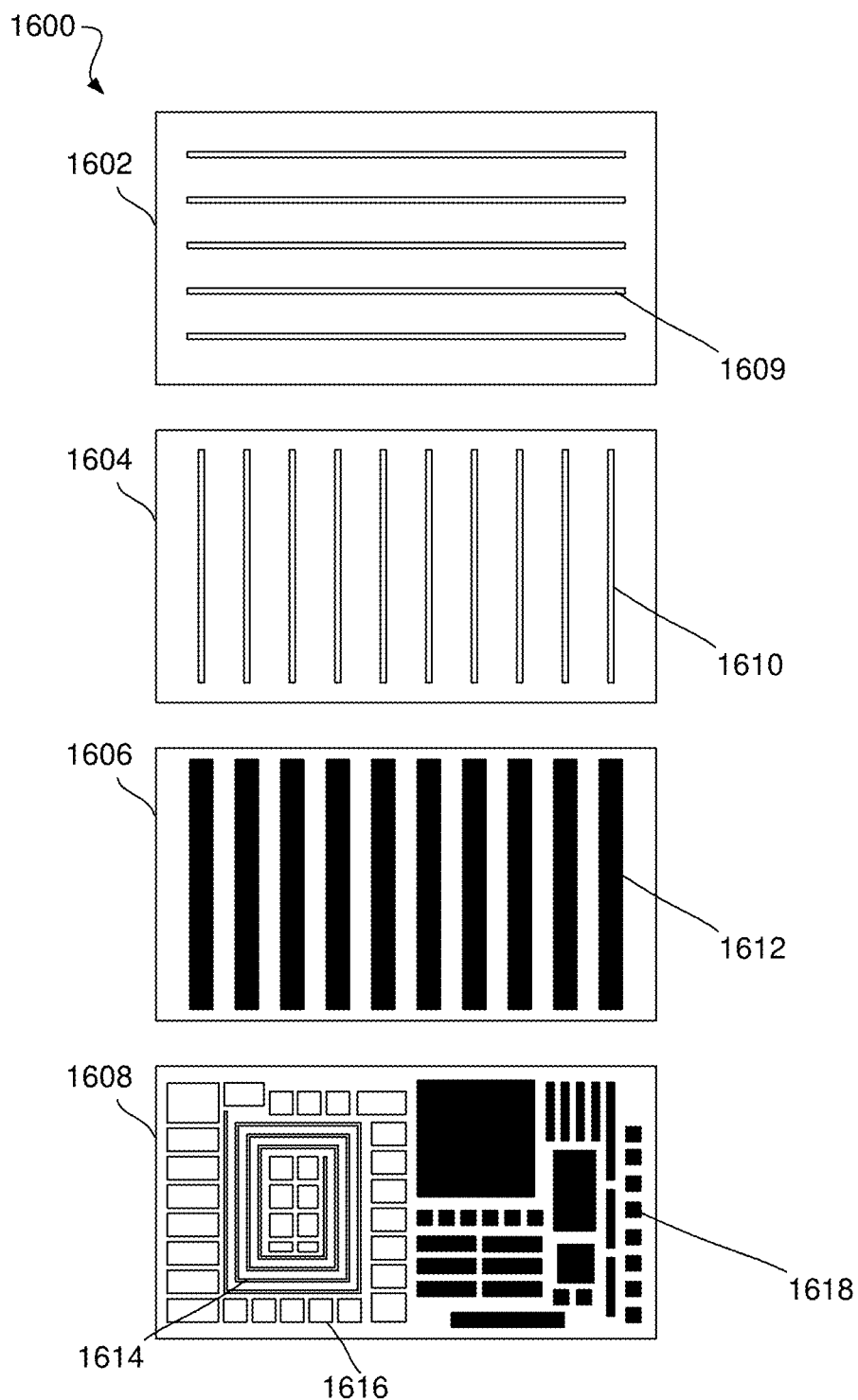
FIG. 16A depicts an example of a stack of layers in accordance with the disclosure.

FIG. 16A depicts a stack of layers of a capacitance module 1600 in accordance with the disclosure. In this example, a capacitance module 1600 includes a first sensor layer 1602 with electrodes 1609, a second sensor layer 1604 with electrodes 1610, a shield layer 1606, and a component layer 1608 with components 1618, an antenna 1614, and anti-warping segments 1616.

In this example, the shield layer 1606 is a segmented shield layer with segments 1612 of shielding material. A segmented shield configuration may include less shielding material than a solid shield. Since the component layer 1608 does not include a solid shield in this example, the shield layer 1606 and the component layer 1608 may have a more similar amount of metal, which may result in the shield layer 1606 and the component layer 1608 having overall more similar coefficients of thermal expansion. As a result in such examples, the shield layer 1606 and the component layer 1608 may expand and shrink and closer rates when the capacitance module 1600 is subjected to heat during manufacturing processes.

In other examples, the shield layer may include a mesh shield, a segmented shield, a solid shield, another type of shield, or combinations thereof. In some examples, the anti-warping segments may be made of a material that is different than the material of the shield layer. In such an example, the thermal expansion rate of the shield layer may be adjusted to align more with the thermal expansion rate of the component layer.

Figure 16B:
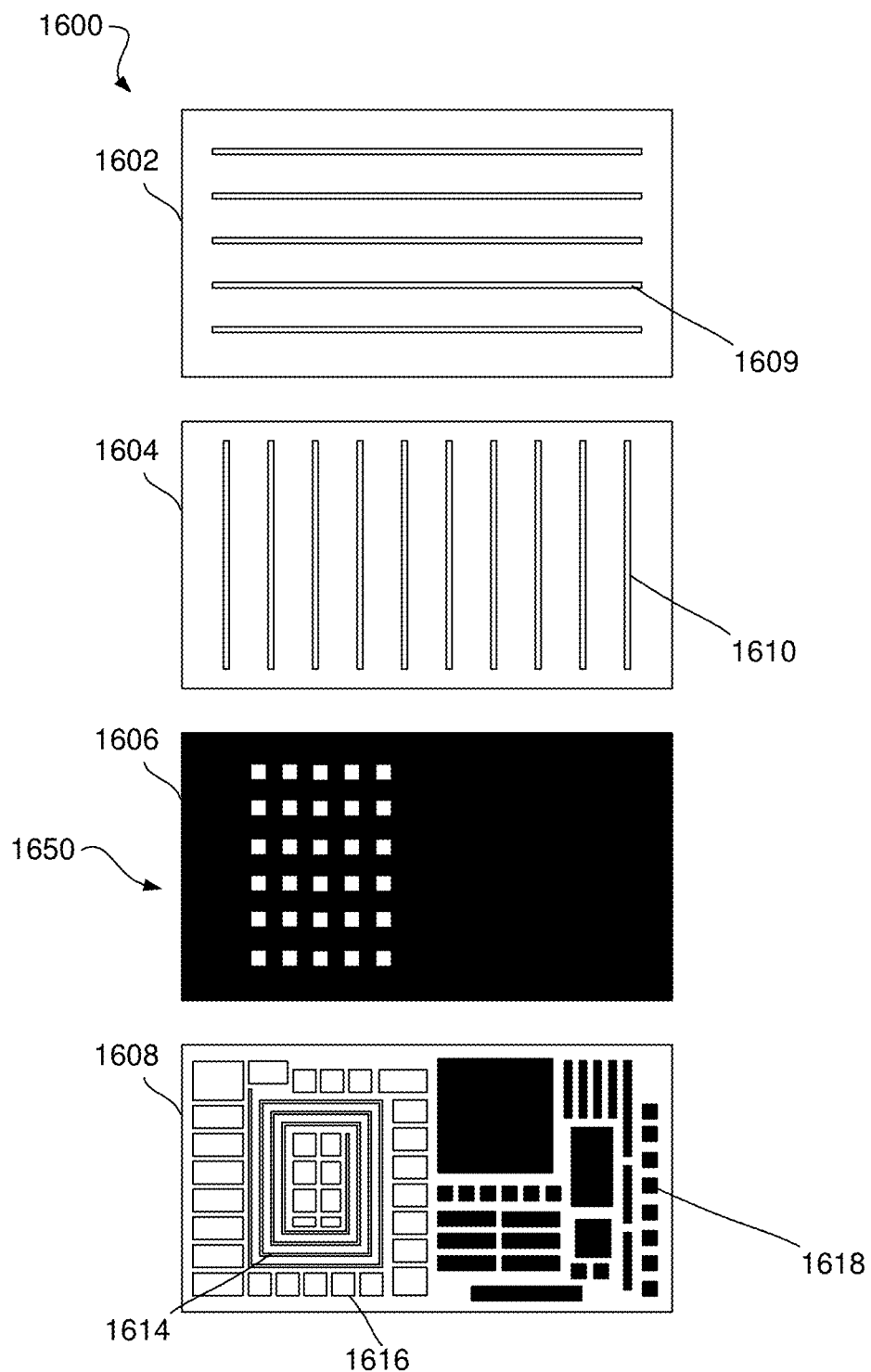
FIG. 16B depicts an example of a stack of layers in accordance with the disclosure.

FIG. 16B depicts an example of a stack of layers in accordance with the present disclosure. The stack 1600 includes a first electrode layer 1602, a second electrode layer 1604, a shield layer 1606, and a component layer 1608.

The shield layer 1606 may be constructed to minimize electrical noise that may interfere with the functioning of the electrode layers 1602, 1604. The shield layer 1606 may include copper, aluminum, and/or other appropriate shielding material. The shield material may be etched, printed, or otherwise deposited on a substrate of the shield layer. A shielding reduction area 1650 may be defined or formed in the shield layer 1606. The shielding reduction area 1650 may include individual openings that may reduce the amount of metal in the shield layer 1606 so that the overall thermal expansion of the shield layer 1606 better matches the overall thermal expansion of the component layer 1608. In some cases, the openings of the shielding reduction area may allow the transmission of an antenna signal to pass through the shield layer 1606.

In cases where the electrically conductive material of the shield layer 1606 is deposited on the shield layer substrate. The openings in the shield reduction area 1650 may be initially formed during the deposition process. In other examples, the entire substrate of the shield layer is covered with the electrically conductive material, and then the openings are etched or otherwise removed during a later process.

The antenna 1614 may be used to transmit a single wireless communication protocol. In other examples, the antenna 1614 may be constructed to transmit and/or send signal according to multiple protocols, including but not limited to a Wi-Fi protocol, a short-range wireless protocol, a near field communication (NFC) protocol, Zigbee protocol, another type of protocol, or combinations thereof. In examples where an antenna layer has multiple antennas, each antenna may be used to transmit according to a different protocol.

In some cases, a pattern of openings in the shield layer 1606 may be arranged to match at least one physical characteristic of an antenna 1614. For example, width of the shield reduction area, the length of the shield reduction area, the spacing of the openings in the shield reduction area, the size of the openings in the shield reduction area, the shape of at least one opening in the shield reduction area, another characteristic of the shield reduction area and/or openings of the shield reduction area may be sized to match the length of the antenna, the width of the antenna, the size of the antenna, the transmission protocol of the antenna, another characteristic of the antenna, or combinations thereof.

For example, the shape, size, orientation, thickness, height, width, length, or another physical parameter of at least one portion of the antenna 1614 may influence the shape and/or size of at least one of the shield reduction area 1650. The openings of the shield reduction area 1650 may overlap with the antenna 1614 so that a transmission from the antenna may pass through the openings. In some examples, the rest of the shield layer 1606 may be solid to block electrical signals which may originate from other sources that may interfere with the sensor layers 1602, 1604 layers.

Figure 17:
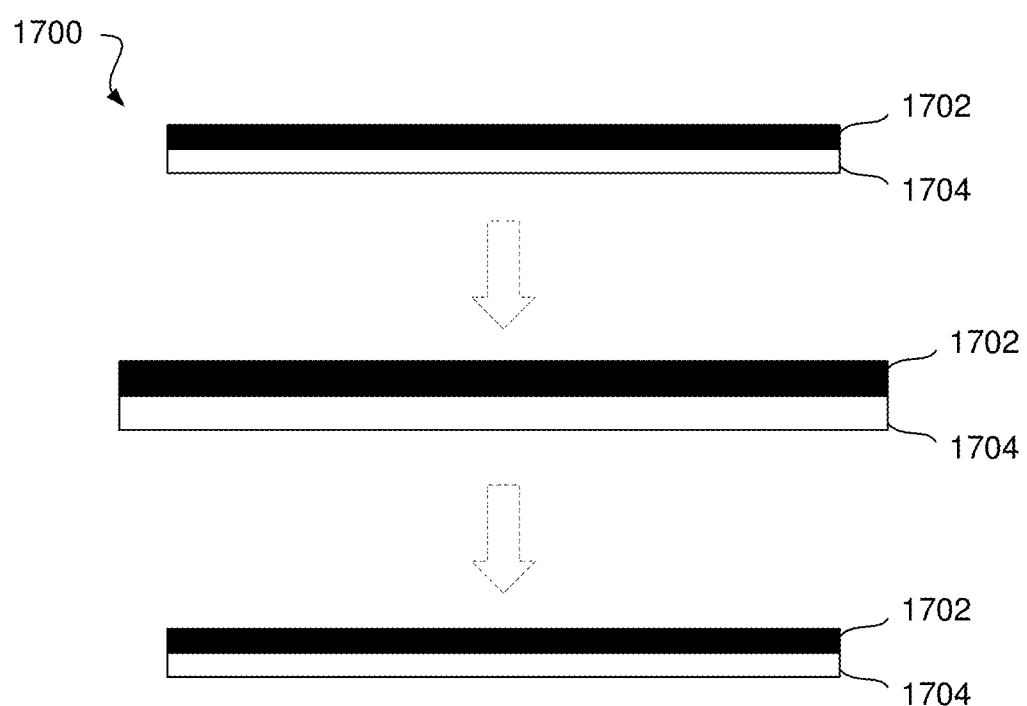
FIG. 17 depicts an example of a manufacturing process in accordance with the disclosure.

FIG. 17 depicts an example of manufacturing a capacitance module in accordance with the disclosure. In this example, the capacitance module 1700 includes a shield layer 1702 and a component layer 1704. The component layer 1704 may include anti-warping segments which cause the CTE of the component layer to match the CTE of the shield layer 1702. As heat is applied to layers 1702, 1704, the shield layer 1702 and component layer 1704 may expand at the same rate or a similar rate. As heat dissipates, the shield layer 1702 and component layer 1704 may contract at the same rate or a similar rate. The anti-warping segments of the component layer may cause the rate that the component layer expands and shrinks to be at least similar to the rate at which the shield layer expands and shrinks. This closer alignment of thermal expansions may reduce internal stresses between the bonded surfaces of the shield layer 1702 and the component layer 1704 that reduces and/or eliminates heat induced deformations in the capacitance module and/or heat induced component failure in the capacitance module.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

The invention claimed is:

1. A capacitance module, comprising:
a sensor layer having a set of electrodes;
a component layer having a controller in communication with the set of electrodes;
a shield layer positioned between the sensor layer and the component layer;
an antenna disposed on the component layer; and
anti-warping segments adjacent to the antenna and disposed on the component layer;
wherein the anti-warping segments are electrically isolated from each other;
wherein the antenna is positioned around the anti-warping segments on the component layer.

2. The capacitance module of claim 1, wherein the anti-warping segments have the characteristic of causing the component layer to have a closer coefficient of thermal expansion to the shield layer.

3. The capacitance module of claim 1, wherein the size of the anti-warping segments have the characteristic of minimizing a formation of eddy currents within the anti-warping segments when the antenna is activated.

4. The capacitance module of claim 3, wherein the size of the anti-warping segments is less than one square centimeter.

5. The capacitance module of claim 1, wherein the antenna is a near field communication antenna.

6. The capacitance module of claim 1, wherein the antenna is a Wi-Fi antenna.

7. The capacitance module of claim 1, wherein the anti-warping segments are positioned around the exterior of the antenna on the component layer.

8. The capacitance module of claim 1, wherein the anti-warping segments are segmented in a first direction aligned to a length of the component layer.

9. The capacitance module of claim 1, wherein the anti-warping segments are segmented in a second direction transverse to the length of the component layer.

10. The capacitance module of claim 1, wherein the anti-warping segments comprise a medial set of segments that surrounds the antenna and a distal set of segments that surround the medial set of segments.

11. The capacitance module of claim 10, wherein the medial set of segments and the distal set of segments are offset from each other such that gaps between segments of the medial set do not align with gaps between segments of the distal set.

12. The capacitance module of claim 1, wherein the anti-wrapping segments are positioned between the antenna and the controller.

13. A portable electronic device, comprising:
a sensor layer having a set of electrodes;
a component layer having a controller in communication with the set of electrodes;
a shield layer positioned between the sensor layer and the component layer;
an antenna disposed on the component layer; and
anti-warping segments adjacent to the antenna and disposed on the component layer;
wherein the anti-warping segments have the characteristic of causing the component layer to have a closer coefficient of thermal expansion to the shield layer;
wherein the antenna is positioned around the anti-warping segments on the component layer.

14. The portable electronic device of claim 13, wherein the anti-warping segments are electrically isolated from each other.

15. The portable electronic device of claim 13, wherein the component layer is part of a touch-sensitive device.

16. The portable electronic device of claim 13, wherein the antenna is a near field communication antenna.

17. The portable electronic device of claim 13, wherein the anti-warping segments are positioned around the exterior of the antenna on the component layer.

18. The portable electronic device of claim 13, wherein the anti-warping segments comprise a medial set of segments that surrounds the antenna and a distal set of segments that surround the medial set of segments.

* * * * *